United States Patent [19]
Masumoto et al.

[11] Patent Number: 4,492,437
[45] Date of Patent: Jan. 8, 1985

[54] ZOOM LENS SYSTEM

[75] Inventors: Hisayuki Masumoto; Masaichi Shimomura, both of Sakai, Japan

[73] Assignee: Minolta Camera Kabushiki Kaisha, Osaka, Japan

[21] Appl. No.: 318,144

[22] Filed: Nov. 4, 1981

[30] Foreign Application Priority Data

Nov. 4, 1980 [JP] Japan ................. 55-154050
Nov. 4, 1980 [JP] Japan ................. 55-154051

[51] Int. Cl.³ ................. G02B 15/14; G02B 15/18
[52] U.S. Cl. ................. 350/428; 350/427
[58] Field of Search ............ 350/423, 427, 428, 450

[56] References Cited

U.S. PATENT DOCUMENTS

| | | | |
|---|---|---|---|
| 3,972,056 | 7/1976 | Tsujimoto et al. | 354/25 |
| 4,045,128 | 8/1977 | Momiyama | 350/455 |
| 4,068,929 | 1/1978 | Yokota | 350/455 |

FOREIGN PATENT DOCUMENTS

| | | |
|---|---|---|
| 49-131426 | 12/1974 | Japan . |
| 49-141841 | 12/1974 | Japan . |
| 50-120357 | 9/1975 | Japan . |
| 53-66223 | 6/1978 | Japan . |
| 53-66224 | 6/1978 | Japan . |

OTHER PUBLICATIONS

Betensky et al., "Continuous Close Focusing Telephoto Zoom Lenses", *SPIE*, vol. 237, 1980 Intl. Lens Design Conf., pp. 488-496.

*Primary Examiner*—John K. Corbin
*Assistant Examiner*—Scott J. Sugarman
*Attorney, Agent, or Firm*—Jackson, Jones & Price

[57] ABSTRACT

A zoom lens system with an improved focusing system is provided. The zoom lens system comprises, from the object to the image side, a front lens group, a zooming lens group including at least a movable lens group, and a macroscopically fixed rear lens group including an aperture stop located inclining towards the object side and a focusing lens group movable on the image side of the aperture stop, wherein the lens system fulfills the following condition:

$$0.1 < \frac{|f_F|}{f_{III} \cdot \gamma} < 2$$

wherein, $f_F$ represents the focal length of the focusing lens group in the rear lens group, $f_{III}$ represents the focal length of the whole rear lens group upon infinity focusing, and $\gamma$ represents the zoom ratio of the zoom lens system.

19 Claims, 95 Drawing Figures f=195.0
(L)
Spherical Aberration

Astigmatism

Distortion f=122.8
(M)
Spherical Aberration

Astigmatism

Distortion f=77.2
(S)
Spherical Aberration

Astigmatism

Distortion (L) Spherical Aberration — Astigmatism — Distortion (M) Spherical Aberration — Astigmatism — Distortion (S) Spherical Aberration — Astigmatism — Distortion FIG.12a  FIG.12b  FIG.12c
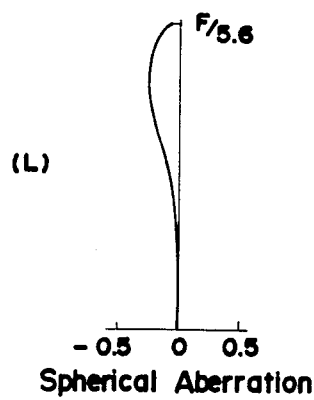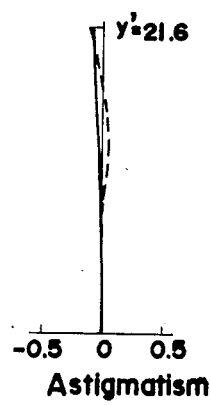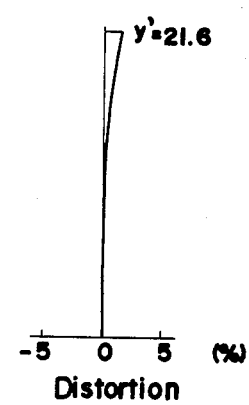
(L)
Spherical Aberration    Astigmatism    Distortion (%)
FIG.13a  FIG.13b  FIG.13c
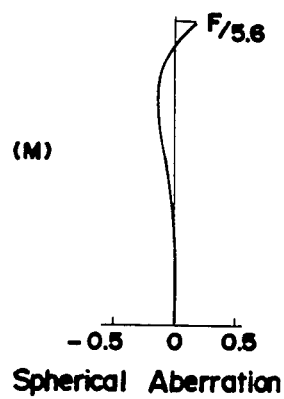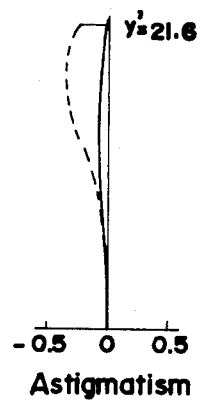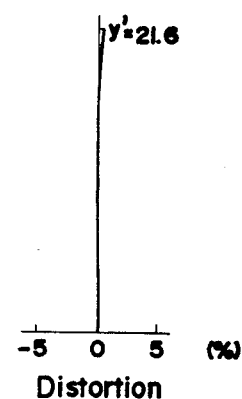
(M)
Spherical Aberration    Astigmatism    Distortion (%)
FIG.14a  FIG.14b  FIG.14c
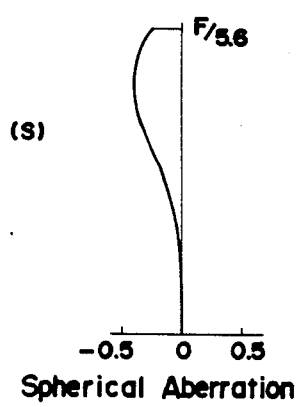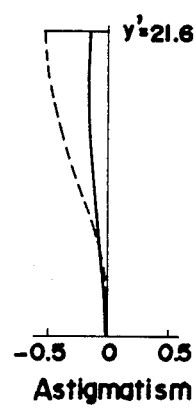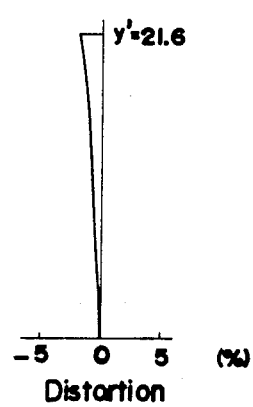
(S)
Spherical Aberration    Astigmatism    Distortion (%)

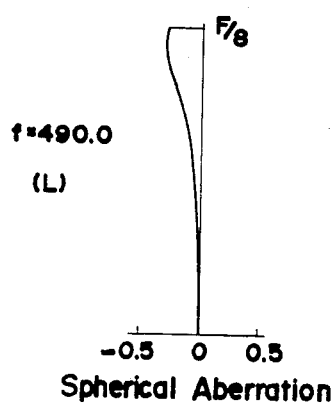
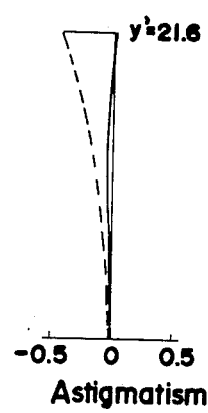
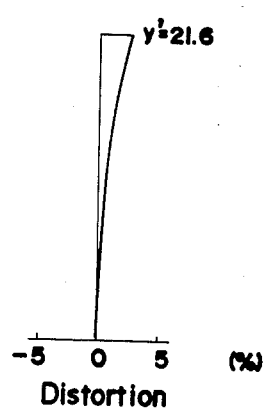
FIG.16a  FIG.16b  FIG.16c
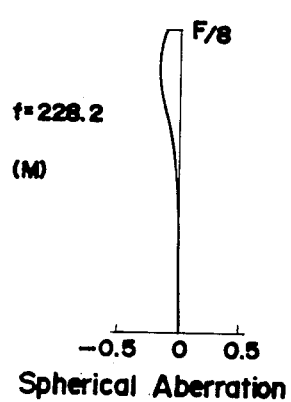
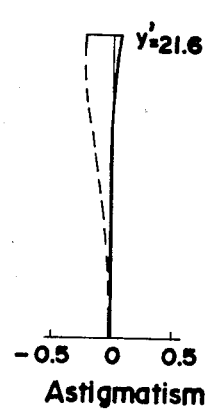
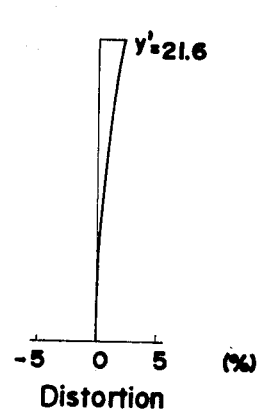
FIG.17a  FIG.17b  FIG.17c
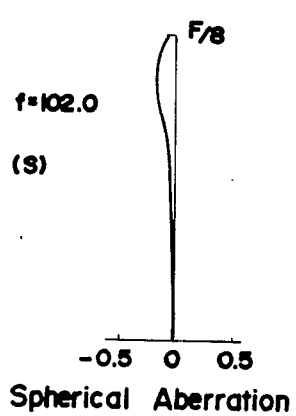
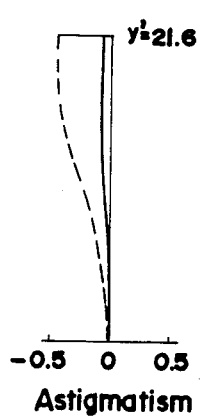
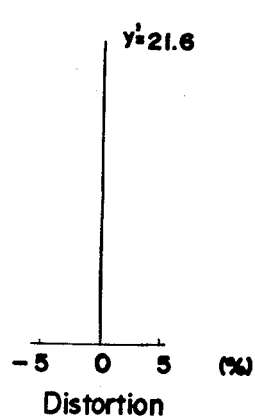
FIG.18a  FIG.18b  FIG.18c (L)
Spherical Aberration Astigmatism Distortion (M)
Spherical Aberration Astigmatism Distortion (S)
Spherical Aberration Astigmatism Distortion FIG. 23a    FIG.23b    FIG.23c
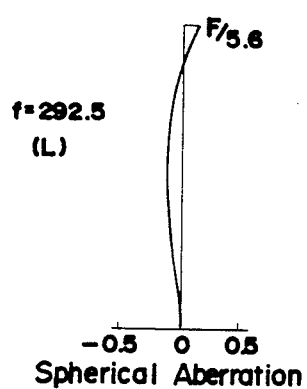 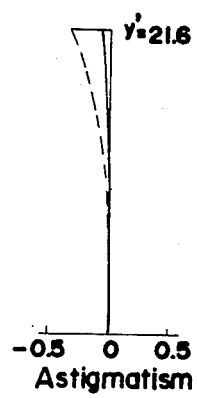 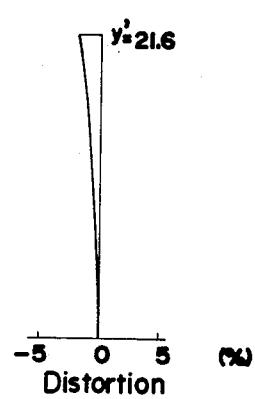
f=292.5
(L)
Spherical Aberration    Astigmatism    Distortion (%)
FIG.24a    FIG.24b    FIG.24c
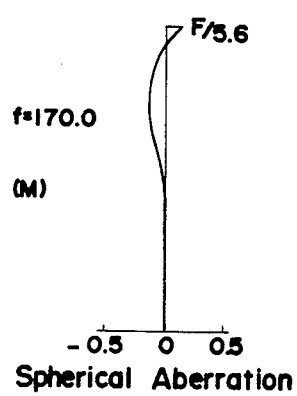 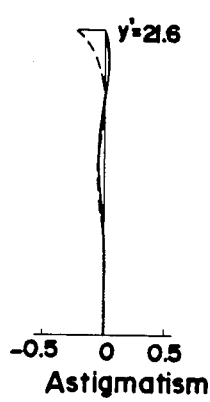 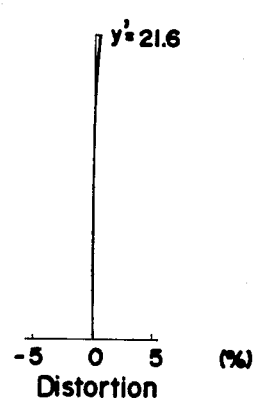
f=170.0
(M)
Spherical Aberration    Astigmatism    Distortion (%)
FIG.25a    FIG.25b    FIG.25c
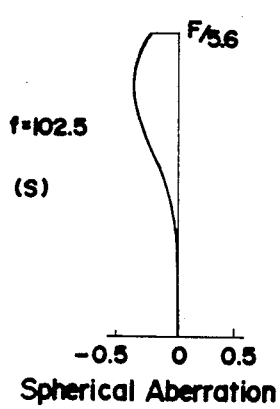 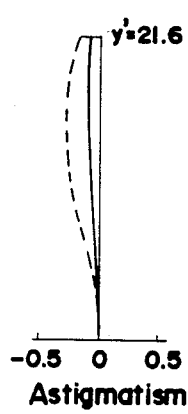 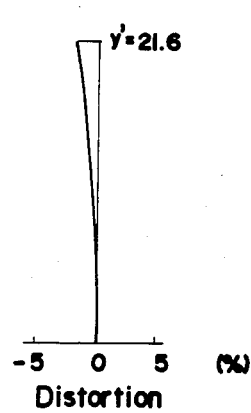
f=102.5
(S)
Spherical Aberration    Astigmatism    Distortion (%)

(L)

(M)

(S)

f=292.5
(L)

F/5.6

-0.5 0 0.5
Spherical Aberration y'=21.6

-0.5 0 0.5
Astigmatism y'=21.6

-5 0 5 (%)
Distortion f=170.0
(M)

F/5.6

-0.5 0 0.5
Spherical Aberration y'=21.6

-0.5 0 0.5
Astigmatism y'=21.6

-5 0 5 (%)
Distortion f=102.5
(S)

F/5.6

-0.5 0 0.5
Spherical Aberration y'=21.6

-0.5 0 0.5
Astigmatism y'=21.6

-5 0 5 (%)
Distortion

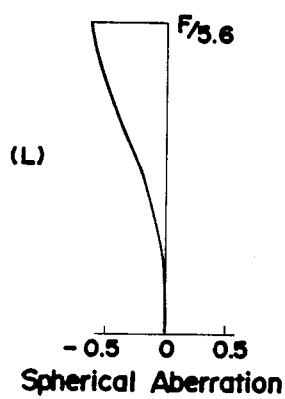
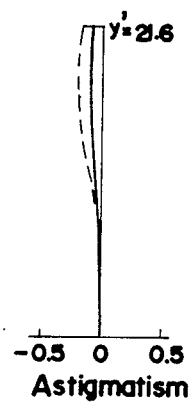
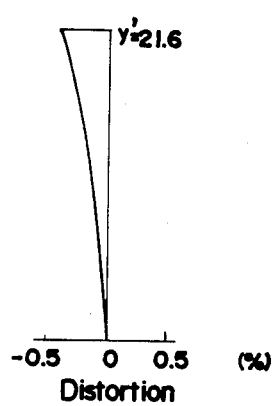
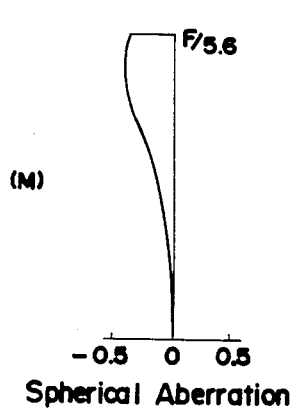
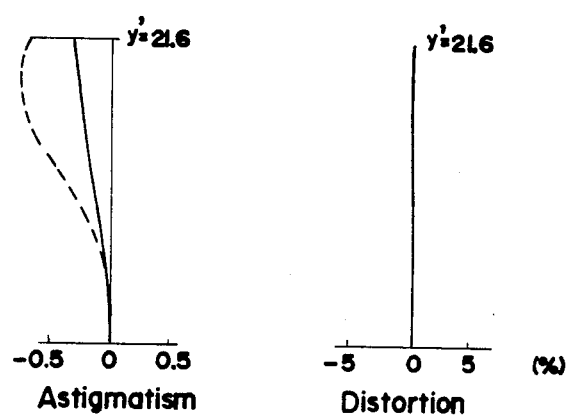
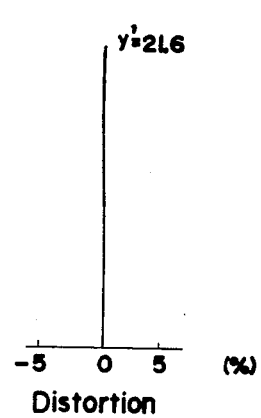
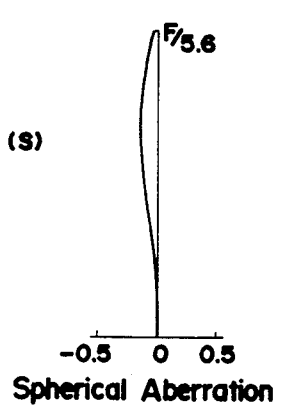
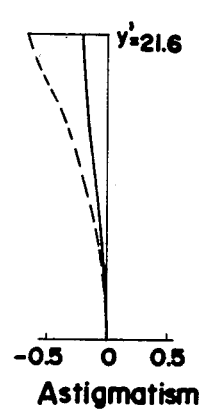
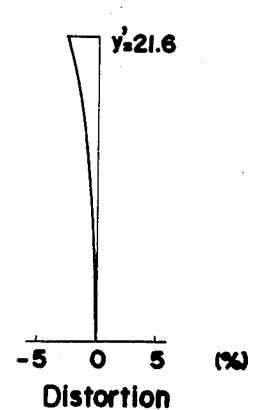

ZOOM LENS SYSTEM

BACKGROUND OF THE INVENTION

1. Field of the Invention

The present invention generally relates to a zoom lens system, and more particularly to an improvement of the focusing system thereof.

2. Description of the Prior Art

In this field of art, there has been known a popular type of zoom lens system which comprises a front focusing lens group, a variator lens group, a compensator lens group and a rear master lens group. However, the front lens group has been of a refractive power within a relatively restricted range with its function of focusing taken into consideration, and a free selection of the refractive power of the front lens group for the sole purpose of aberration correction has not been permitted. Further, the radius of the front lens group has been relatively great for covering the light rays upon its shift to the object side in close focusing, which contradicts the demand for the compactness of the system.

The prior art is still seeking to provide an improvement of the focusing system of zoom lens systems.

SUMMARY OF THE INVENTION

An object of the present invention is to provide a zoom lens system with a novel focusing system.

Another object of the present invention is to provide a zoom lens system of a compact size.

Still another object of the present invention is to provide a novel type of zoom lens system with an advantage in correcting aberrations.

A further object of the present invention is to provide a zoom lens system that is particularly suitable for mounting on an automatic focus control camera.

The present invention provides a zoom lens system comprising, from the object to the image side, a front lens group, a zooming lens group including at least a movable lens group, and a macroscopically fixed rear lens group including an aperture stop located inclining towards the object side and a focusing lens group or unit movable on the image side of the aperture stop, wherein the lens system fulfills the following condition:

$$0.1 < \frac{|f_F|}{f_{III} \cdot \gamma} < 2$$

wherein: $f_F$ represents the focal length of the focusing lens group in the rear lens group, $f_{III}$ represents the focal length of the whole rear lens group upon infinity focusing, and $\gamma$ represents the zoom ratio of the zoom lens system.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIGS. 12A to 12C represent the aberration curves of the second embodiment for the longest focal length in close focusing;

FIGS. 13A to 13C represent the aberration curves of the second embodiment for the medium focal length in close focusing;

FIGS. 14A to 14C represent the aberration curves of the second embodiment for the shortest focal length in close focusing

FIGS. 16A to 16C represent the aberration curves of the third embodiment for the longest focal length;

FIGS. 17A to 17C represent the aberration curves of the third embodiment for a medium focal length;

FIGS. 18A to 18C represent the aberration curves of the third embodiment for the shortest focal length;

FIGS. 23A to 23C represent the aberration curves of the fourth embodiment for the longest focal length;

FIGS. 24A to 24C represent the aberration curves of the fourth embodiment for a medium focal length;

FIGS. 25A to 25C represent the aberration curves of the fourth embodiment for the shortest focal length;

FIGS. 33A to 33C represent the aberration curves of the fifth embodiment for the longest focal length in close focusing;

FIGS. 34A to 34C represent the aberration curves of the fifth embodiment for the medium focal length in close focusing; and FIGS. 35A to 35C represent the aberration curves of the fifth embodiment for the shortest focal length in close focusing.

DETAILED DESCRIPTION OF THE PREFERRED EMBODIMENTS

Figure 1:
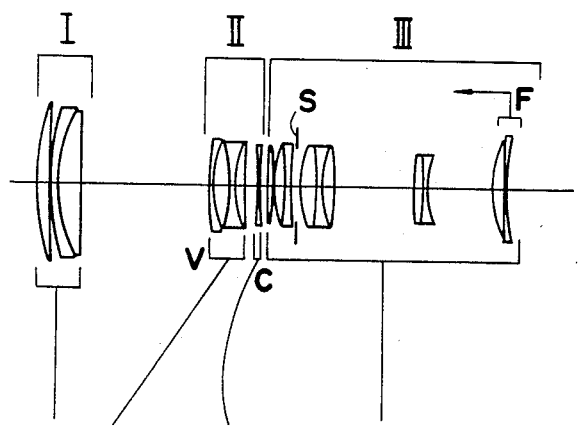
FIG. 1 represents cross sectional view of the lens system according to a first embodiment of the present invention.
Figure 2A:
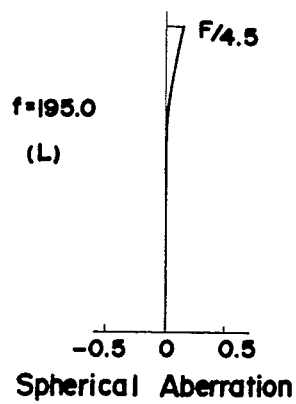
FIGS. 2A to 2C represent aberration curves of the first embodiment for the longest focal length.
Figure 2B:
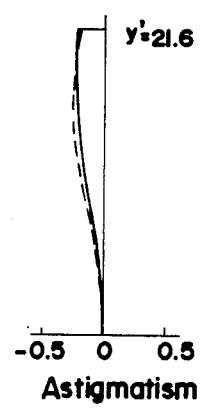
Figure 2C:
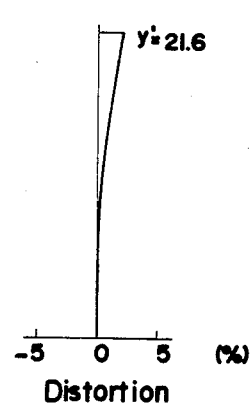
Figure 3A:
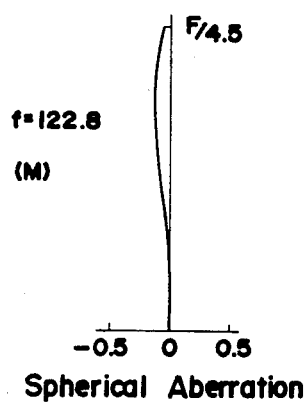
FIGS. 3A to 3C represent aberration curves of the first embodiment for a medium focal length.
Figure 3B:
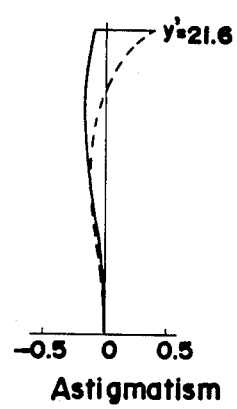
Figure 3C:
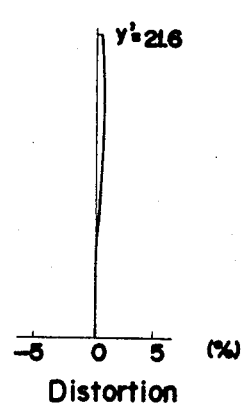
Figure 4A:
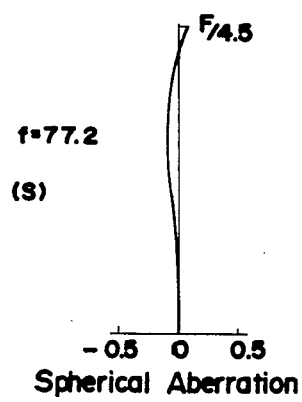
FIGS. 4A to 4C represent aberration curves of the first embodiment for the shortest focal length.
Figure 4B:
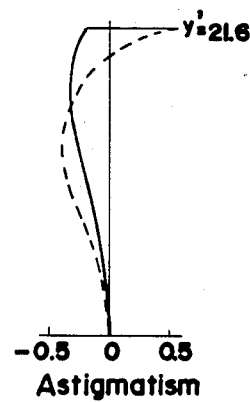
Figure 4C:
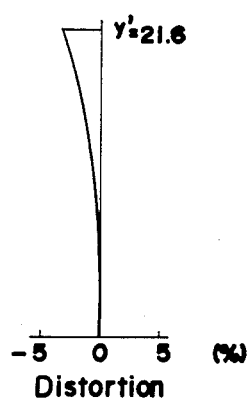
Figure 5A:
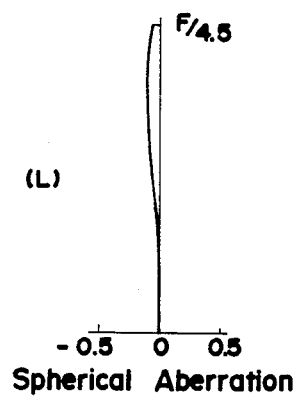
FIGS. 5A to 5C represent aberration curves of the first embodiment for the longest focal length in close focusing.
Figure 5B:
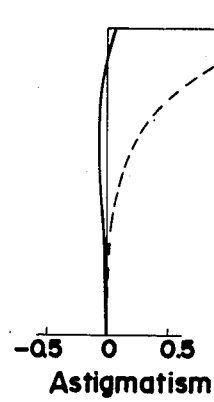
Figure 5C:
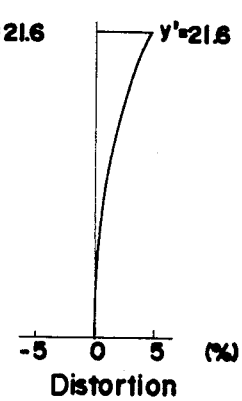
Figure 6A:
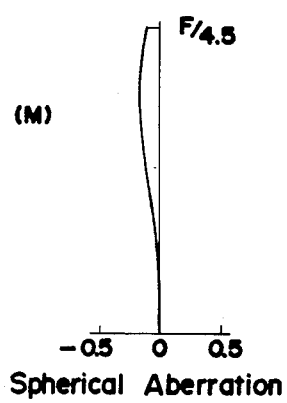
FIGS. 6A to 6C represent the aberration curves of the first embodiment for the medium focal length in close focusing.
Figure 6B:
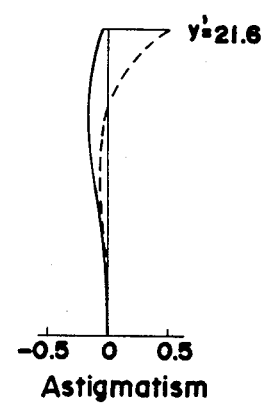
Figure 6C:
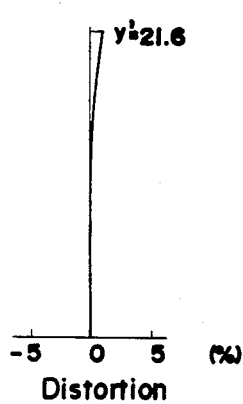
Figure 7A:
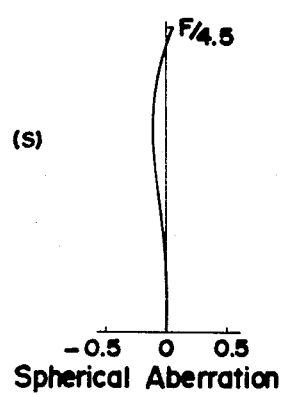
FIGS. 7A to 7C represent the aberration curves of the first embodiment for the shortest focal length in close focusing.
Figure 7B:
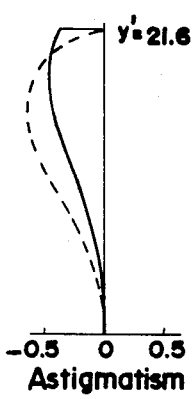
Figure 7C:
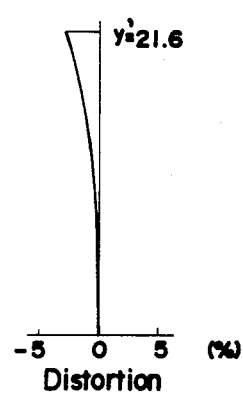

The following description is provided to enable any person skilled in the optical and camera field to make and use the present invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens groups and lens elements for longest focal length (L). Due to the number of lens elements involved, it was not deemed appropriate to include individual designation of the radius of curvature and axial distances for each lens element and air space. These values, however, are provided in the accompanying Tables set forth herein, and the schematic cross sectional views of the respective embodiments follow the normal conventions of an object at the left-hand side of the drawing and the image plane at the right-hand side. Lines below the schematic cross sectional views represent the concept of movements of the lens groups.

As disclosed in FIGS. 1, 8, 15, 22 and 29, the present invention provides a zoom lens system comprising, from the object to the image side, a front lens group (I), a zooming lens group (II) including at least a movable lens group, and a macroscopically fixed rear lens group (II) including an aperture stop (S) located inclining towards the object side and a focusing lens group or unit (F) movable on the image side of the aperture stop (S) which provides a conventional variable aperture size.

The lens system according to the present invention further fulfills the following condition:

$$0.1 < \frac{|f_F|}{f_{III} \cdot \gamma} < 2$$

wherein: $f_F$ represents the focal length of the focusing lens group (F) in the rear lens group or unit (III), $f_{III}$ represents the focal length of the whole rear lens group (III) upon infinity focusing, and $\gamma$ represents the zoom ratio of the zoom lens system.

The above condition is necessary to totally correct the expected changes in various aberrations due to both the zooming by means of the zooming lens group (II) and the focusing by means of the focusing lens group or unit (F) in the rear lens group (III). The condition is also important in view of the fact that the height of the off-axial pencil passing through the focusing lens group or unit (F) is relatively high because of the location of the aperture stop (S) inclining toward the object side in the rear lens group (III). If the lower limit of the condition is violated, the desired balance of aberration corrections is no more maintained in the zoom range to result in an insufficient aberration correction either in the longer or shorter focal length side upon close focusing. On the other hand, if the upper limit of the condition is violated, any practical zoom lens system is hardly obtainable since the closest object distance or the zoom ratio is unsatisfactory.

The following Tables 1 to 5 disclose, respectively, the first through fifth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lens components along the optical axis, N equals the refractive index and again, the sub numbers refer to the particular optical element from the object to image side, and finally, $\nu$ equals the Abbe number and the sub numbers refer to the specific lens elements from the object to image side. The air space distances in the Tables provided with three separate values disclose the relative displacement between each of the respective focal lengths.

TABLE 1

[Embodiment 1]
f = 195.0~122.8~77.2  $F_{NO}$ = 4.5

| | | Radius of Curvature | | Axial Distance | Refractive Index | | Abbe Number |
|---|---|---|---|---|---|---|---|
| | $r_1$ | 95.563 | | | | | |
| | | | $d_1$ | 4.300 | $N_1$ 1.51823 | $\nu_1$ | 58.96 |
| | $r_2$ | 720.269 | | | | | |
| | | | $d_2$ | 0.120 | | | |
| I | $r_3$ | 105.410 | | | | | |
| | | | $d_3$ | 1.680 | $N_2$ 1.75450 | $\nu_2$ | 32.83 |
| | $r_4$ | 45.765 | | | | | |
| | | | $d_4$ | 7.770 | $N_3$ 1.61272 | $\nu_3$ | 58.52 |

TABLE 1-continued

[Embodiment 1]
f = 195.0~122.8~77.2   F$_{NO}$ = 4.5

| | | Radius of Curvature | | Axial Distance | | Refractive Index | | Abbe Number |
|---|---|---|---|---|---|---|---|---|
| | r$_5$ | 1470.976 | | | | | | |
| | | | d$_5$ | 42.916~26.280~5.050 | | | | |
| | r$_6$ | 115.780 | | | | | | |
| | | | d$_6$ | 1.200 | N$_4$ | 1.72000 | ν$_4$ | 50.31 |
| | r$_7$ | 41.103 | | | | | | |
| | | | d$_7$ | 5.623 | | | | |
| | r$_8$ | −45.187 | | | | | | |
| II | | | d$_8$ | 1.500 | N$_5$ | 1.60000 | ν$_5$ | 64.38 |
| | r$_9$ | 42.526 | | | | | | |
| | | | d$_9$ | 3.200 | N$_6$ | 1.78472 | ν$_6$ | 25.70 |
| | r$_{10}$ | 220.131 | | | | | | |
| | | | d$_{10}$ | 4.213~14.273~39.536 | | | | |
| | r$_{11}$ | −123.721 | | | | | | |
| | | | d$_{11}$ | 1.500 | N$_7$ | 1.67000 | ν$_7$ | 57.07 |
| | r$_{12}$ | 843.056 | | | | | | |
| | | | d$_{12}$ | 1.459~8.035~4.002 | | | | |
| | r$_{13}$ | 223.538 | | | | | | |
| | | | d$_{13}$ | 2.800 | N$_8$ | 1.74000 | ν$_8$ | 28.26 |
| | r$_{14}$ | −58.573 | | | | | | |
| | | | d$_{14}$ | 0.120 | | | | |
| | r$_{15}$ | 62.726 | | | | | | |
| | | | d$_{15}$ | 3.300 | N$_9$ | 1.51763 | ν$_9$ | 53.47 |
| | r$_{16}$ | −65.386 | | | | | | |
| | | | d$_{16}$ | 1.950 | N$_{10}$ | 1.80518 | ν$_{10}$ | 25.43 |
| | r$_{17}$ | 290.458 | | | | | | |
| | | | d$_{17}$ | 2.800 (Aperture stop) | | | | |
| | r$_{18}$ | 40.612 | | | | | | |
| | | | d$_{18}$ | 5.828 | N$_{11}$ | 1.48749 | ν$_{11}$ | 70.15 |
| | r$_{19}$ | −55.165 | | | | | | |
| | | | d$_{19}$ | 1.523 | N$_{12}$ | 1.72342 | ν$_{12}$ | 37.99 |
| III | r$_{20}$ | 44.160 | | | | | | |
| | | | d$_{20}$ | 0.351 | | | | |
| | r$_{21}$ | 41.659 | | | | | | |
| | | | d$_{21}$ | 3.990 | N$_{13}$ | 1.48749 | ν$_{13}$ | 70.15 |
| | r$_{22}$ | −111.200 | | | | | | |
| | | | d$_{22}$ | 25.960 | | | | |
| | r$_{23}$ | 98.244 | | | | | | |
| | | | d$_{23}$ | 2.500 | N$_{14}$ | 1.78472 | ν$_{14}$ | 25.75 |
| | r$_{24}$ | −1153.801 | | | | | | |
| | | | d$_{24}$ | 1.500 | N$_{15}$ | 1.51680 | ν$_{15}$ | 64.12 |
| | r$_{25}$ | 26.452 | | | | | | |
| | | | d$_{25}$ | 22.000 | | | | |
| | r$_{26}$ | 45.668 | | | | | | |
| | | | d$_{26}$ | 4.000 | N$_{16}$ | 1.72000 | ν$_{16}$ | 50.31 |
| F | r$_{27}$ | 2749.518 | | | | | | |
| | | | d$_{27}$ | 1.000 | N$_{17}$ | 1.71736 | ν$_{17}$ | 29.42 |
| | r$_{28}$ | 88.147 | | | | | | |

TABLE 2

[Embodiment 2]
f = 292.5~170.0~102.5   F$_{NO}$ = 5.6

| | | Radius of Curvature | | Axial Distance | | Refractive Index | | Abbe Number |
|---|---|---|---|---|---|---|---|---|
| | r$_1$ | 92.527 | | | | | | |
| | | | d$_1$ | 5.700 | N$_1$ | 1.48749 | ν$_1$ | 70.15 |
| | r$_2$ | −381.033 | | | | | | |
| I | | | d$_2$ | 0.150 | | | | |
| | r$_3$ | 93.089 | | | | | | |
| | | | d$_3$ | 6.300 | N$_2$ | 1.48749 | ν$_2$ | 70.15 |
| | r$_4$ | −1001.161 | | | | | | |
| | | | d$_4$ | 2.300 | N$_3$ | 1.80518 | ν$_3$ | 25.43 |
| | r$_5$ | 216.492 | | | | | | |
| | | | d$_5$ | 45.949~29.329~2.500 | | | | |
| | r$_6$ | 1517.358 | | | | | | |
| | | | d$_6$ | 4.000 | N$_4$ | 1.80518 | ν$_4$ | 25.43 |
| | r$_7$ | −54.061 | | | | | | |
| | | | d$_7$ | 1.400 | N$_5$ | 1.60311 | ν$_5$ | 60.74 |
| | r$_8$ | 60.071 | | | | | | |
| | | | d$_8$ | 4.000 | | | | |
| | r$_9$ | −50.010 | | | | | | |
| II | | | d$_9$ | 1.400 | N$_6$ | 1.71300 | ν$_6$ | 53.93 |
| | r$_{10}$ | 140.251 | | | | | | |
| | | | d$_{10}$ | 1.350~28.644~44.008 | | | | |
| | r$_{11}$ | 175.853 | | | | | | |
| | | | d$_{11}$ | 5.000 | N$_7$ | 1.58913 | ν$_7$ | 61.11 |

TABLE 2-continued

[Embodiment 2]

$f = 292.5 \sim 170.0 \sim 102.5$   $F_{NO} = 5.6$

| | | Radius of Curvature | | Axial Distance | Refractive Index | | Abbe Number |
|---|---|---|---|---|---|---|---|
| | $r_{12}$ | −29.412 | | | | | |
| | | | $d_{12}$ | 1.300 | $N_8$ 1.80750 | $\nu_8$ | 35.45 |
| | $r_{13}$ | −58.937 | | | | | |
| | | | $d_{13}$ | 13.000∼2.325∼13.791 (Aperture stop) | | | |
| | $r_{14}$ | 119.485 | | | | | |
| | | | $d_{14}$ | 4.639 | $N_9$ 1.48749 | $\nu_9$ | 70.15 |
| | $r_{15}$ | −86.617 | | | | | |
| | | | $d_{15}$ | 0.500 | | | |
| | $r_{16}$ | −184.191 | | | | | |
| | | | $d_{16}$ | 1.200 | $N_{10}$ 1.74000 | $\nu_{10}$ | 37.53 |
| | $r_{17}$ | 316.456 | | | | | |
| | | | $d_{17}$ | 0.534 | | | |
| | $r_{18}$ | 72.721 | | | | | |
| | | | $d_{18}$ | 4.028 | $N_{11}$ 1.48749 | $\nu_{11}$ | 70.15 |
| | $r_{19}$ | −185.759 | | | | | |
| | | | $d_{19}$ | 27.986 | | | |
| III | $r_{20}$ | −77.742 | | | | | |
| | | | $d_{20}$ | 1.000 | $N_{12}$ 1.67100 | $\nu_{12}$ | 51.77 |
| | $r_{21}$ | 32.792 | | | | | |
| | | | $d_{21}$ | 2.600 | $N_{13}$ 1.65446 | $\nu_{13}$ | 33.86 |
| | $r_{22}$ | 61.429 | | | | | |
| | | | $d_{22}$ | 26.014 | | | |
| | $r_{23}$ | −1183.263 | | | | | |
| | | | $d_{23}$ | 3.500 | $N_{14}$ 1.62135 | $\nu_{14}$ | 61.28 |
| | $r_{24}$ | −120.007 | | | | | |
| F | | | $d_{24}$ | 1.200 | | | |
| | $r_{25}$ | 207.084 | | | | | |
| | | | $d_{25}$ | 3.500 | $N_{15}$ 1.51680 | $\nu_{15}$ | 64.12 |
| | $r_{26}$ | −214.656 | | | | | |

TABLE 3

[Embodiment 3]

$f = 490.0 \sim 228.2 \sim 102.0$   $F_{NO} = 8$

| | | Radius of Curvature | | Axial Distance | Refractive Index | | Abbe Number |
|---|---|---|---|---|---|---|---|
| | $r_1$ | 185.134 | | | | | |
| | | | $d_1$ | 5.000 | $N_1$ 1.61765 | $\nu_1$ | 55.15 |
| | $r_2$ | −1027.221 | | | | | |
| I | | | $d_2$ | 0.150 | | | |
| | $r_3$ | 152.260 | | | | | |
| | | | $d_3$ | 3.000 | $N_2$ 1.74000 | $\nu_2$ | 31.70 |
| | $r_4$ | 64.971 | | | | | |
| | | | $d_4$ | 8.500 | $N_3$ 1.62280 | $\nu_3$ | 56.98 |
| | $r_5$ | 373.811 | | | | | |
| | | | $d_5$ | 92.969∼57.958∼2.935 | | | |
| | $r_6$ | 532.229 | | | | | |
| | | | $d_6$ | 2.000 | $N_4$ 1.67790 | $\nu_4$ | 55.38 |
| | $r_7$ | 63.143 | | | | | |
| | | | $d_7$ | 6.000 | | | |
| | $r_8$ | −73.518 | | | | | |
| | | | $d_8$ | 2.000 | $N_5$ 1.65830 | $\nu_5$ | 58.52 |
| II | $r_9$ | 46.824 | | | | | |
| | | | $d_9$ | 4.000 | $N_6$ 1.76182 | $\nu_6$ | 26.55 |
| | $r_{10}$ | 305.795 | | | | | |
| | | | $d_{10}$ | 4.271∼28.971∼94.372 | | | |
| | $r_{11}$ | −92.887 | | | | | |
| | | | $d_{11}$ | 1.800 | $N_7$ 1.72000 | $\nu_7$ | 50.31 |
| | $r_{12}$ | 122.196 | | | | | |
| | | | $d_{12}$ | 2.200 | $N_8$ 1.76182 | $\nu_8$ | 26.55 |
| | $r_{13}$ | −1278.020 | | | | | |
| | | | $d_{13}$ | 2.500∼12.811∼2.433 | | | |
| | $r_{14}$ | 147.096 | | | | | |
| | | | $d_{14}$ | 1.200 | $N_9$ 1.80518 | $\nu_9$ | 25.43 |
| | $r_{15}$ | 60.373 | | | | | |
| | | | $d_{15}$ | 5.000 | $N_{10}$ 1.48749 | $\nu_{10}$ | 70.15 |
| | $r_{16}$ | −47.537 | | | | | |
| | | | $d_{16}$ | 1.637 (Aperture stop) | | | |
| | $r_{17}$ | 72.377 | | | | | |
| | | | $d_{17}$ | 4.000 | $N_{11}$ 1.48749 | $\nu_{11}$ | 70.15 |
| | $r_{18}$ | −79.035 | | | | | |
| | | | $d_{18}$ | 2.000 | | | |
| | $r_{19}$ | −34.093 | | | | | |
| | | | $d_{19}$ | 4.000 | $N_{12}$ 1.81100 | $\nu_{12}$ | 44.86 |
| | $r_{20}$ | 45.287 | | | | | |
| | | | $d_{20}$ | 4.000 | $N_{13}$ 1.58144 | $\nu_{13}$ | 40.83 |

TABLE 3-continued

[Embodiment 3]
$f = 490.0 \sim 228.2 \sim 102.0$  $F_{NO} = 8$

| | | Radius of Curvature | | Axial Distance | | Refractive Index | | Abbe Number |
|---|---|---|---|---|---|---|---|---|
| III | $r_{21}$ | −302.089 | | | | | | |
| | | | $d_{21}$ | 0.368 | | | | |
| | $r_{22}$ | 112.649 | | | | | | |
| | | | $d_{22}$ | 6.000 | $N_{14}$ | 1.51763 | $\nu_{14}$ | 53.47 |
| | $r_{23}$ | −32.710 | | | | | | |
| | | | $d_{23}$ | 63.500 | | | | |
| | $r_{24}$ | 37.713 | | | | | | |
| | | | $d_{24}$ | 3.676 | $N_{15}$ | 1.58913 | $\nu_{15}$ | 61.11 |
| | $r_{25}$ | 32.229 | | | | | | |
| | | | $d_{25}$ | 6.618 | | | | |
| | $r_{26}$ | 56.232 | | | | | | |
| | | | $d_{26}$ | 2.206 | $N_{16}$ | 1.74000 | $\nu_{16}$ | 28.26 |
| F | $r_{27}$ | −5534.644 | | | | | | |
| | | | $d_{27}$ | 1.838 | $N_{17}$ | 1.80750 | $\nu_{17}$ | 35.45 |
| | $r_{28}$ | 40.904 | | | | | | |

TABLE 4

[Embodiment 4]
$f = 292.5 \sim 170.0 \sim 102.5$  $F_{NO} = 5.6$

| | | Radius of Curvature | | Axial Distance | | Refractive Index | | Abbe Number |
|---|---|---|---|---|---|---|---|---|
| I | $r_1$ | 110.941 | | | | | | |
| | | | $d_1$ | 5.300 | $N_1$ | 1.49520 | $\nu_1$ | 79.74 |
| | $r_2$ | −326.449 | | | | | | |
| | | | $d_2$ | 0.150 | | | | |
| | $r_3$ | 101.109 | | | | | | |
| | | | $d_3$ | 6.300 | $N_2$ | 1.48749 | $\nu_2$ | 70.15 |
| | $r_4$ | −537.135 | | | | | | |
| | | | $d_4$ | 2.300 | $N_3$ | 1.80518 | $\nu_3$ | 25.43 |
| | $r_5$ | 339.697 | | | | | | |
| | | | $d_5$ | 46.980~29.929~2.500 | | | | |
| II | $r_6$ | −2873.067 | | | | | | |
| | | | $d_6$ | 4.000 | $N_4$ | 1.80518 | $\nu_4$ | 25.43 |
| | $r_7$ | −50.263 | | | | | | |
| | | | $d_7$ | 1.400 | $N_5$ | 1.61272 | $\nu_5$ | 58.52 |
| | $r_8$ | 60.007 | | | | | | |
| | | | $d_8$ | 4.000 | | | | |
| | $r_9$ | −50.145 | | | | | | |
| | | | $d_9$ | 1.400 | $N_6$ | 1.69680 | $\nu_6$ | 55.52 |
| | $r_{10}$ | 156.528 | | | | | | |
| | | | $d_{10}$ | 1.350~28.091~43.093 | | | | |
| | $r_{11}$ | 204.337 | | | | | | |
| | | | $d_{11}$ | 5.000 | $N_7$ | 1.58913 | $\nu_7$ | 61.11 |
| | $r_{12}$ | −30.676 | | | | | | |
| | | | $d_{12}$ | 1.300 | $N_8$ | 1.80750 | $\nu_8$ | 35.45 |
| | $r_{13}$ | −58.282 | | | | | | |
| | | | $d_{13}$ | 11.500~1.811~14.237 (Aperture stop) | | | | |
| III | $r_{14}$ | 175.703 | | | | | | |
| | | | $d_{14}$ | 3.827 | $N_9$ | 1.51680 | $\nu_9$ | 64.12 |
| | $r_{15}$ | −67.854 | | | | | | |
| | | | $d_{15}$ | 1.562 | $N_{10}$ | 1.80518 | $\nu_{10}$ | 25.43 |
| | $r_{16}$ | −107.607 | | | | | | |
| | | | $d_{16}$ | 43.081 | | | | |
| | $r_{17}$ | 102.208 | | | | | | |
| | | | $d_{17}$ | 1.289 | $N_{11}$ | 1.76182 | $\nu_{11}$ | 26.55 |
| | $r_{18}$ | 92.920 | | | | | | |
| | | | $d_{18}$ | 3.896 | $N_{12}$ | 1.58913 | $\nu_{12}$ | 61.11 |
| | $r_{19}$ | −370.621 | | | | | | |
| | | | $d_{19}$ | 0.500 | | | | |
| | $r_{20}$ | 84.751 | | | | | | |
| | | | $d_{20}$ | 3.000 | $N_{13}$ | 1.80518 | $\nu_{13}$ | 25.43 |
| F | $r_{21}$ | 211.613 | | | | | | |
| | | | $d_{21}$ | 1.000 | $N_{14}$ | 1.70030 | $\nu_{14}$ | 47.67 |
| | $r_{22}$ | 39.027 | | | | | | |

TABLE 5

[Embodiment 5]
$f = 292.5 \sim 170.0 \sim 102.5$  $F_{NO} = 5.6$

| Radius of Curvature | | Axial Distance | | Refractive Index | | Abbe Number |
|---|---|---|---|---|---|---|
| $r_1$ | 91.272 | | | | | |
| | | $d_1$ | 5.500 | $N_1$ | 1.48749 | $\nu_1$ | 70.15 |

TABLE 5-continued

[Embodiment 5]
$f = 292.5 \sim 170.0 \sim 102.5 \quad F_{NO} = 5.6$

|   |   |     | Radius of Curvature |          | Axial Distance | Refractive Index |         | Abbe Number |
|---|---|-----|---------------------|----------|----------------|------------------|---------|-------------|
| I |   | $r_2$ | 401.027 |  |  |  |  |  |
|   |   |     |          | $d_2$   | 0.150          |                  |         |             |
|   |   | $r_3$ | 92.639   |         |                |                  |         |             |
|   |   |     |          | $d_3$   | 6.300          | $N_2$            | 1.48749 | $\nu_2$ 70.15 |
|   |   | $r_4$ | −1165.622 |        |                |                  |         |             |
|   |   |     |          | $d_4$   | 2.300          | $N_3$            | 1.80518 | $\nu_3$ 25.43 |
|   |   | $r_5$ | 211.609  |         |                |                  |         |             |
|   |   |     |          | $d_5$   | 45.875∼29.279∼2.500 |             |         |             |
| II |  | $r_6$ | 758.633 |         |                |                  |         |             |
|   |   |     |          | $d_6$   | 4.000          | $N_4$            | 1.80518 | $\nu_4$ 25.43 |
|   |   | $r_7$ | −54.859  |         |                |                  |         |             |
|   |   |     |          | $d_7$   | 1.400          | $N_5$            | 1.60311 | $\nu_5$ 60.74 |
|   |   | $r_8$ | 58.804   |         |                |                  |         |             |
|   |   |     |          | $d_8$   | 4.000          |                  |         |             |
|   |   | $r_9$ | −49.896  |         |                |                  |         |             |
|   |   |     |          | $d_9$   | 1.400          | $N_6$            | 1.71300 | $\nu_6$ 53.93 |
|   |   | $r_{10}$ | 132.829 |       |                |                  |         |             |
|   |   |     |          | $d_{10}$ | 1.350∼28.688∼44.073 |            |         |             |
|   |   | $r_{11}$ | 168.37 |        |                |                  |         |             |
|   |   |     |          | $d_{11}$ | 5.00         | $N_7$            | 1.58913 | $\nu_7$ 61.11 |
|   |   | $r_{12}$ | −30.739 |       |                |                  |         |             |
|   |   |     |          | $d_{12}$ | 1.300        | $N_8$            | 1.80750 | $\nu_8$ 35.45 |
|   |   | $r_{13}$ | −60.998 |       |                |                  |         |             |
|   |   |     |          | $d_{13}$ | 13.000∼2.258∼13.652 (Aperture stop) |  |   |       |
| III |  | $r_{14}$ | 241.851 |       |              |                  |         |             |
|   |   |     |          | $d_{14}$ | 4.076        | $N_9$            | 1.51680 | $\nu_9$ 64.12 |
|   |   | $r_{15}$ | −70.060 |       |                |                  |         |             |
|   |   |     |          | $d_{15}$ | 0.100        |                  |         |             |
|   |   | $r_{16}$ | 50.061 |        |                |                  |         |             |
|   |   |     |          | $d_{16}$ | 3.752        | $N_{10}$         | 1.51680 | $\nu_{10}$ 64.12 |
|   |   | $r_{17}$ | −135.377 |      |                |                  |         |             |
|   |   |     |          | $d_{17}$ | 1.234        | $N_{11}$         | 1.80750 | $\nu_{11}$ 35.45 |
|   |   | $r_{18}$ | 110.961 |       |                |                  |         |             |
|   |   |     |          | $d_{18}$ | 33.844       |                  |         |             |
|   | F | $r_{19}$ | −70.217 |       |                |                  |         |             |
|   |   |     |          | $d_{19}$ | 2.800        | $N_{12}$         | 1.70055 | $\nu_{12}$ 30.11 |
|   |   | $r_{20}$ | −27.500 |       |                |                  |         |             |
|   |   |     |          | $d_{20}$ | 1.171        | $N_{13}$         | 1.67000 | $\nu_{13}$ 57.07 |
|   |   | $r_{21}$ | −104.599 |      |                |                  |         |             |
|   |   |     |          | $d_{21}$ | 0.910        |                  |         |             |
|   |   | $r_{22}$ | 166.599 |       |                |                  |         |             |
|   |   |     |          | $d_{22}$ | 1.000        | $N_{14}$         | 1.78831 | $\nu_{14}$ 47.32 |
|   |   | $r_{23}$ | 44.766  |       |                |                  |         |             |
|   |   |     |          | $d_{23}$ | 13.800       |                  |         |             |
|   |   | $r_{24}$ | −520.697 |      |                |                  |         |             |
|   |   |     |          | $d_{24}$ | 4.000        | $N_{15}$         | 1.51680 | $\nu_{15}$ 64.12 |
|   |   | $r_{25}$ | −66.521 |       |                |                  |         |             |

In the first and second embodiments, the focusing lens group or unit (F) is of a positive refractive power and movable from the image side to the object side upon focusing from infinity toward the closer object distance. On the contrary, in the third to fifth embodiments, the focusing lens group or unit (F) is of a negative refractive power and movable from the object to the image side upon focusing from the infinity toward the closer object distance.

FIG. 1 represents the schematic cross sectional view of the first embodiment of Table 1 for the longest focal length (L). The focusing lens unit (F) consists of a positive cemented doublet. The lines extending below the Figure are to provide a relative understanding of the axial movements of the respective lens groups in zooming. Straight vertical lines represent that the corresponding lens groups are fixed. FIGS. 2A, 2B and 2C, FIGS. 3A, 3B and 3C, and FIGS. 4A, 4B and 4C represent the aberration curves of the first embodiment in infinity focusing for the longest (L), medium (M) and shortest (S) focal lengths, respectively. FIGS. 5A, 5B and 5C, FIGS. 6A, 6B and 6C, and FIGS. 7A, 7B and 7C represent the aberration curves of the first embodiment during close focusing to D=3 m by means of the movement of the focusing lens unit (F) for the longest (L), medium (M), and shortest (S) focal lengths, respectively. The actual movement of the focusing lens unit (F) toward the object side for focusing to D=3 m is 17.3 mm for the longest focal length and 2.9 mm for the shortest focal length.

Figure 8:
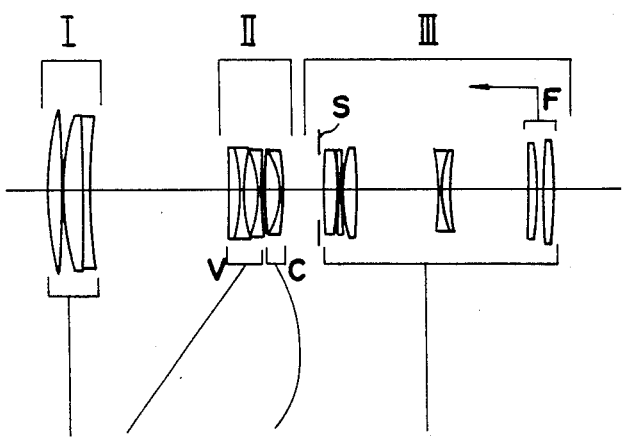
FIG. 8 represents cross sectional view of the lens system according to a second embodiment of the present invention.
Figure 9A:
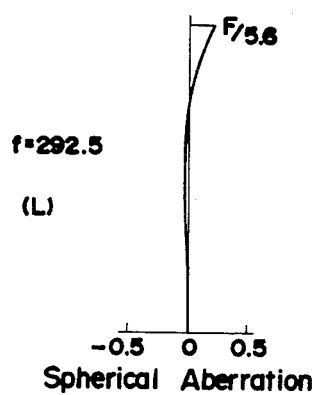
FIGS. 9A to 9C represent aberration curves of the second embodiment for the longest focal length.
Figure 9B:
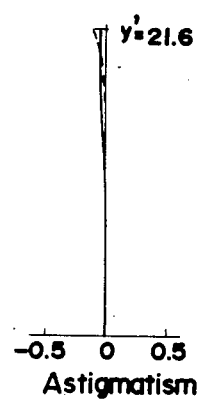
Figure 9C:
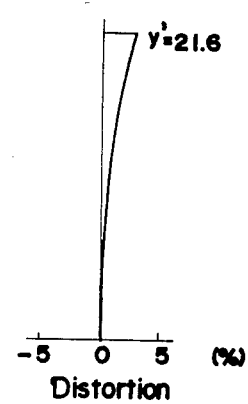
Figure 10A:
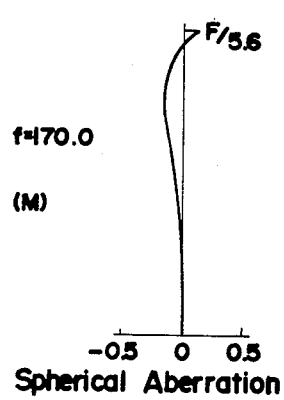
FIGS. 10A to 10C represent aberration curves of the second embodiment for a medium focal length.
Figure 10B:
Figure 10C:
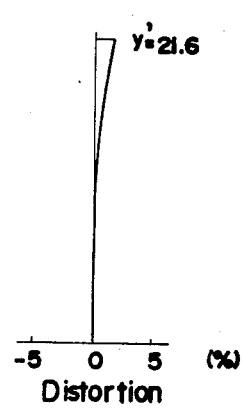
Figure 11A:
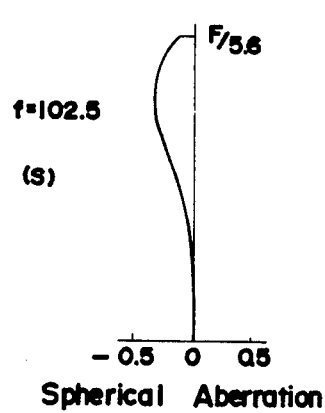
FIGS. 11A to 11C represent aberration curves of the second embodiment for the shortest focal length.
Figure 11B:
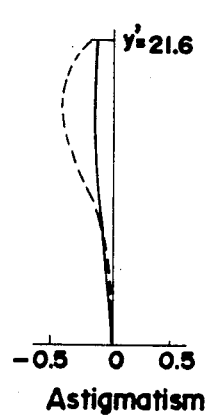
Figure 11C:
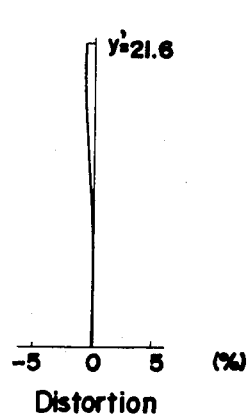

FIG. 8 similarly represents the schematic cross sectional view of the second embodiment of Table 2 for the longest focal length (L). The focusing lens group (F) consists of a pair of separate positive single lens elements. FIGS. 9A, 9B and 9C, FIGS. 10A, 10B and 10C, and FIGS. 11A, 11B and 11C represent the aberration curves of the second embodiment in infinity focusing for the longest (L), medium (M) and shortest (S) focal lengths, respectively. FIGS. 12A, 12B and 12C, FIGS. 13A, 13B and 13C, and FIGS. 14A, 14B and 14C represent the aberration curves of the second embodiment during close focusing to D=4 m by means of the movement of the focusing lens group (F) for the longest (L), medium (M), and shortest (S) focal lengths, respectively. The actual movement of the focusing lens group (F) toward the object side for focusing to D=4 m is 14.6 mm for the longest focal length and 2.9 mm for the shortest focal length.

Figure 15:
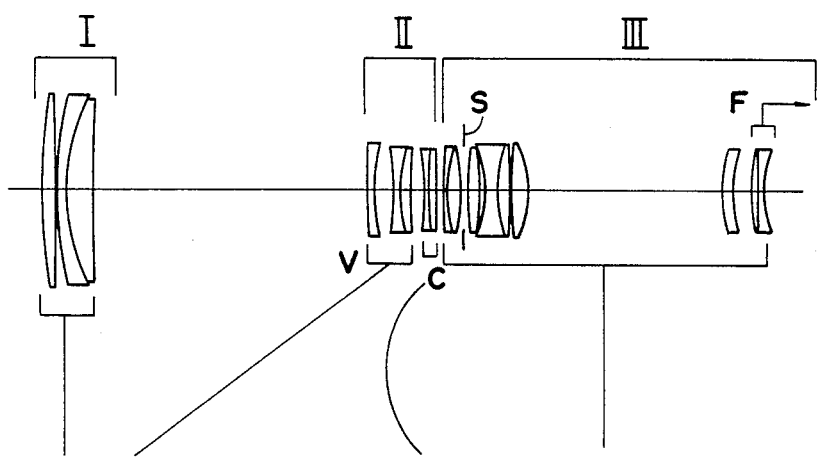
FIG. 15 represents cross sectional view of the lens system according to a third embodiment of the present invention.
Figure 19A:
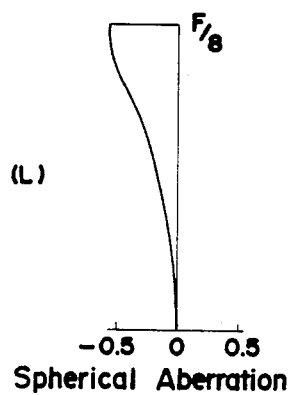
FIGS. 19A to 19C represent the aberration curves of the third embodiment for the longest focal length in close focusing.
Figure 19B:
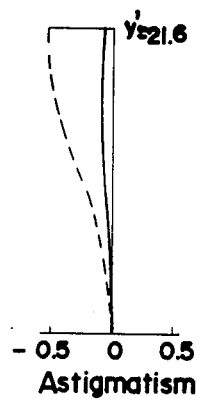
Figure 19C:
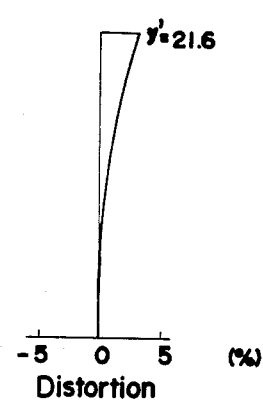
Figure 20A:
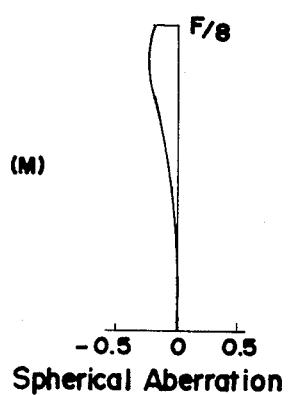
FIGS. 20A to 20C represent the aberration curves of the third embodiment for the medium focal length in close focusing.
Figure 20B:
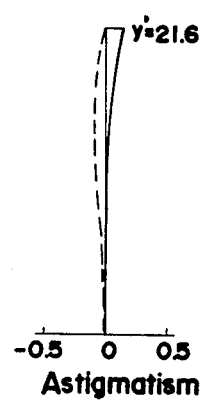
Figure 20C:
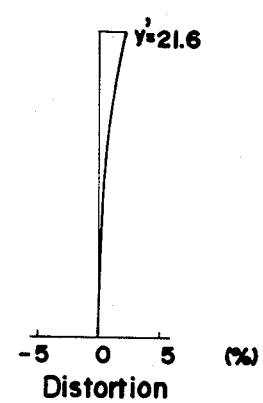
Figure 21A:
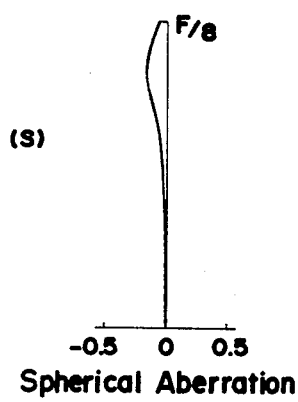
FIGS. 21A to 21C represent the aberration curves of the third embodiment for the shortest focal length in close focusing.
Figure 21B:
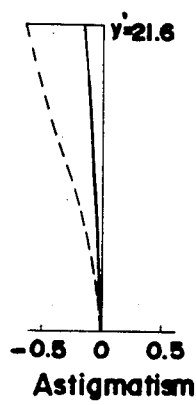
Figure 21C:
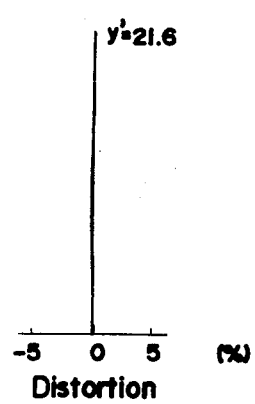

FIG. 15 similarly represents the schematic cross sectional views of the third embodiment of Table 3 for the longest focal length (L). The focusing lens unit (F) consists of a negative cemented doublet. FIGS. 16A, 16B and 16C, FIGS. 17A, 17B and 17C, and FIGS. 18A, 18B and 18C represent the aberration curves of the third embodiment in infinity focusing for the longest (L), medium (M) and shortest (S) focal lengths, respectively. FIGS. 19A, 19B and 19C, FIGS. 20A, 20B and 20C and FIGS. 21A, 21B and 21C represent the aberration curves of the third embodiment during close focusing to D=5m by means of the movement of the focusing lens group (F) for the longest (L), medium (M), and shortest (S) focal lengths, respectively. The actual movement of the focusing lens unit (F) toward the image side for focusing to D=5 m is 36.9 mm for the longest focal length and 1.4 mm for the shortest focal length.

Figure 22:
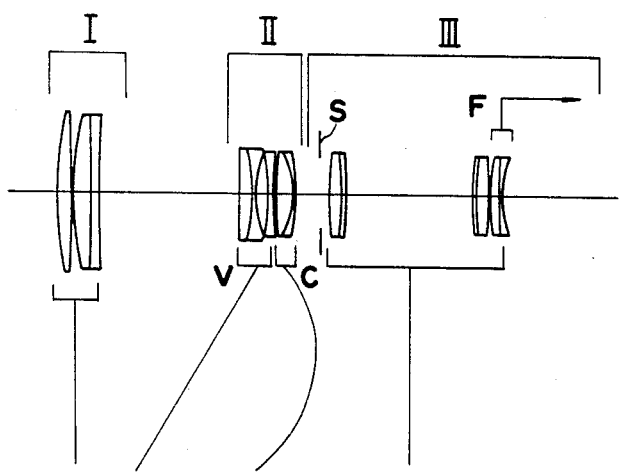
FIG. 22 represents cross sectional view of the lens system according to a fourth embodiment of the present invention.
Figure 26A:
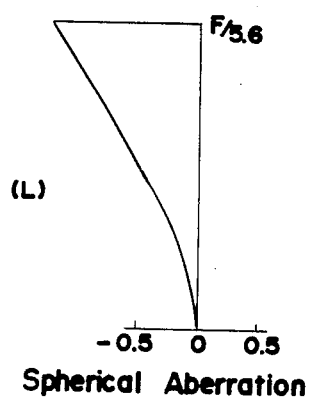
FIGS. 26A to 26C represent the aberration curves of the fourth embodiment for the longest focal length in close focusing.
Figure 26B:
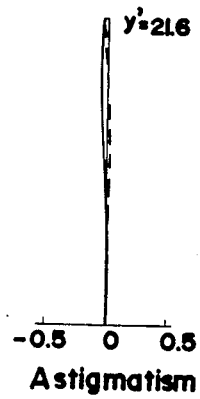
Figure 26C:
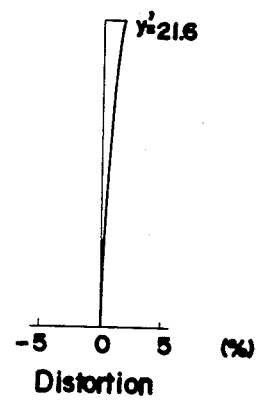
Figure 27A:
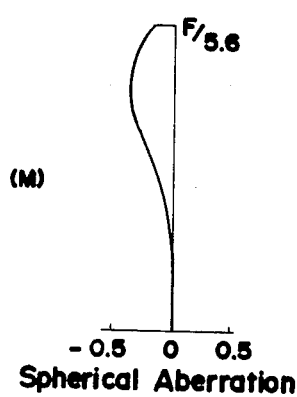
FIGS. 27A to 27C represent the aberration curves of the fourth embodiment for the medium focal length in close focusing.
Figure 27B:
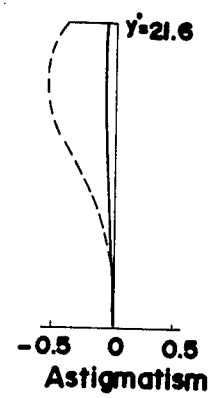
Figure 27C:
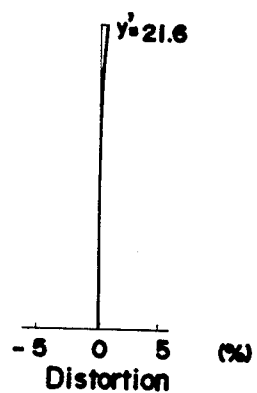
Figure 28A:
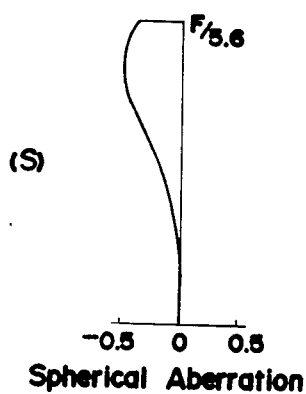
FIGS. 28A to 28C represent the aberration curves of the fourth embodiment for the shortest focal length in close focusing.
Figure 28B:
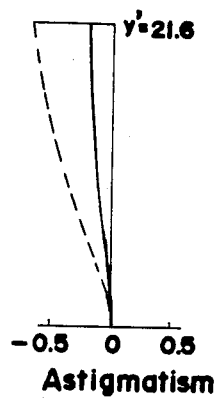
Figure 28C:
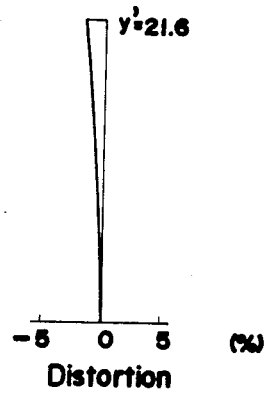

FIG. 22 similarly represents the schematic cross sectional views of the fourth embodiment of Table 4 for the longest focal length (L). The focusing lens unit (F) consists of a negative cemented doublet. FIGS. 23A, 23B and 23C, FIGS. 24A, 24B and 24C, and FIGS. 25A, 25B and 25C represent the aberration curves of the fourth embodiment in infinity focusing for the longest (L), medium (M) and shortest (S) focal lengths, respectively. FIGS. 26A, 26B and 26C, FIGS. 27A, 27B and 27CC, and FIGS. 28A, 28B and 28C represent the aberration curves of the fourth embodiment during close focusing to D=3 m by means of the movement of the focusing lens unit (F) for the longest (L), medium (M), and shortest (S) focal lengths, respectively. The actual movement of the focusing lens group (F) toward the image side for focusing to D=3 m is 14.2 mm for the longest focal length and 1.7 mm for the shortest focal length.

Figure 29:
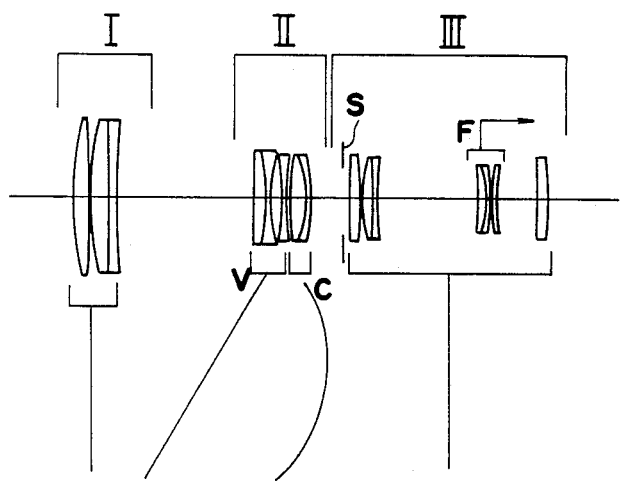
FIG. 29 represents cross sectional view of the lens system according to a fifth embodiment of the present invention.
Figure 30A:
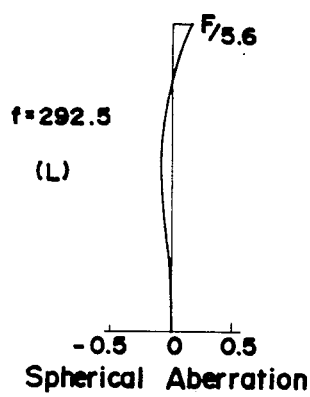
FIGS. 30A to 30C represent the aberration curves of the fifth embodiment for the longest focal length.
Figure 30B:
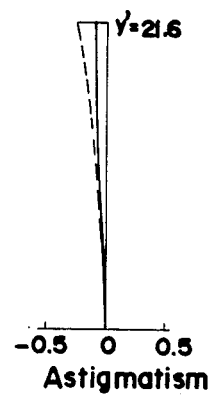
Figure 30C:
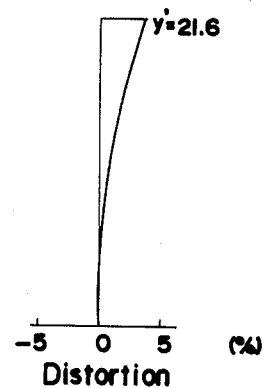
Figure 31A:
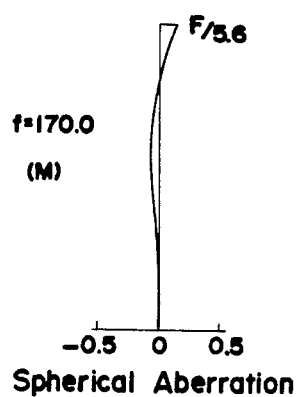
FIGS. 31A to 31C represent the aberration curves of the fifth embodiment for the medium focal length.
Figure 31B:
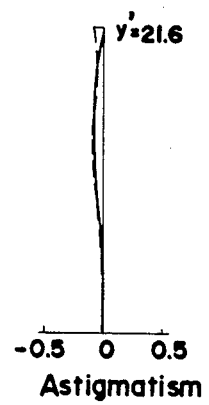
Figure 31C:
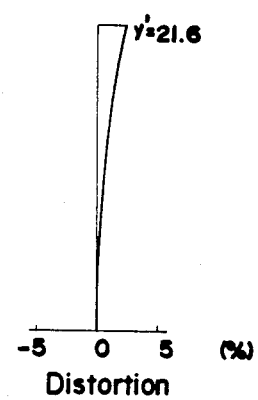
Figure 32A:
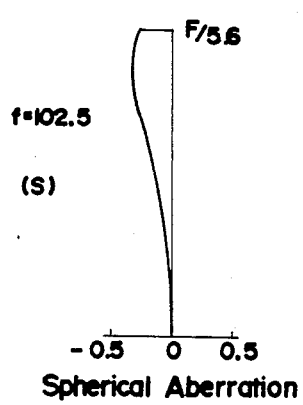
FIGS. 32A to 32C represent the aberration curves of the fifth embodiment for the shortest focal length.
Figure 32B:
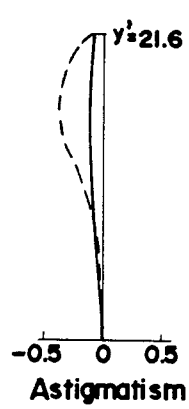
Figure 32C:
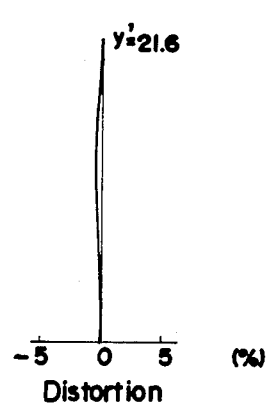

FIG. 29 similarly represents the schematic cross sectional view of the fifth embodiment of Table 5 for the longest focal length (L). The focusing lens group (F) consists of a cemented doublet and a negative single lens element. FIGS. 30A, 30B and 30C, FIGS. 31A, 31B and 31C, and FIGS. 32A, 32B and 32C represent the aberration curves of the fifth embodiment in infinity focusing for the longest (L), medium (M) and shortest (S) focal lengths, respectively. FIGS. 33A, 33B and 33C, FIGS. 34A, 34B and 34C, and FIGS. 35A, 35B and 35C represent the aberration curves of the fifth embodiment during close focusing to D=3 'm by means of the movement of the focusing lens group (F) for the longest (L), medium (M), and shortest (S) focal lengths, respectively. The actual movement of the focusing lens group (F) toward the image side for focusing to D=3 m is 11.8 mm for the longest focal length and 1.4 mm for the shortest focal length.

With respect to the location of the aperture stop, the first and third embodiments each include an aperture stop (S) located between lens elements of the rear lens group (III), while the rear lens group (III) is led by the aperture stop (S) in the second, fourth and fifth embodiments.

In each of the above embodiments, the shortest object distance capable of being focused is identical irrespective of the focal length changed by zooming. The shortest object distance, however, is not necessarily so designed, but may differ depending on the change in focal length. For example, in the first embodiment, a focusing to D=0.6 m is possible in the shortest focal length (S) by means of further shifting the focusing lens unit (F) by 14.4 mm toward the object side from the position for D=3 m. Similarly, in the third embodiment, a focusing to D=0.5 m is possible in the shortest focal length (S) by means of further shifting the focusing lens unit (F) by 35.5 mm toward the image side from the position for D=5 m.

According to an additional feature of the present invention, the focusing lens group or unit (F) of the first and second embodiments each include at least a positive lens with the stronger refractive surface facing the object side. In other words, the focusing lens unit (F) of the first embodiment consists of a positive doublet with its absolute curvature of the object side surface stronger than that of the image side surface, and the focusing lens group (F) of the second embodiment consists of a pair of positive lenses, the image side one of which has an object side surface with a stronger absolute curvature than the image side surface. Corresponding to the above feature, the focusing lens group or unit (F) of the third to fifth embodiments each include at least a negative lens with the stronger refractive surface facing the image side. Namely, the third and fourth embodiments each have a focusing lens unit (F) consisting of a negative doublet with an image side surface of a stronger curvature than the object side surface, and the focusing lens group (F) of the fifth embodiment includes a negative single lens element with an image side surface of a stronger curvature than the object side surface. The above feature is quite favorable to the correction of spherical aberration which otherwise would change in accordance with the focusing.

The focusing lens group or unit (F) of the present invention is of a lightweight and simple construction as is apparent from the embodiments.

The above described feature that the focusing lens group or unit of the present invention is of lightweight and simple construction and is located at the image side of the lens system is particularly suitable to a focus control system in which the focusing lens unit is driven by a power source located within the camera body and controlled by an electric signal, such as a motor. In other words, the zoom lens system according to the present invention is extremely favorable to those cameras wherein focusing is accomplished by a driving power source under the control of an electric signal, such as an automatic focus control camera. This is because the focusing lens unit is located at the image side of the lens system, i.e., adjacent or inside the camera body, and is close to the driving source within the camera body to simplify the interconnection between the focusing lens unit and the driving source. Additionally, the use of a lightweight focusing lens unit saves power in driving it and permits a rapid focusing with less energy consumption of a battery or the like having a restricted capacity when contained in the camera body.

Although the degree of the movement of the focusing lens unit differs in dependence on the change in focal length for zooming, there is no problem if the focusing is under the control of an electric signal which is derived from an electric circuit in which the compensation for the difference in the degree of movement of the focusing lens unit is electrically dealt with.

Further, according to the present invention, the front lens group is substantially free from the burden of a focusing operation. Therefore, the radius of the front lens group can be relatively reduced, which is favorable to the desired compactness of the lens system, and the free selection of refractive power for the front lens group can be permitted for the convenience of aberration correction. And, the front lens group is actually fixed in all of the specific embodiments to derive these benefits. However, the present invention is not necessarily limited to an embodiment in which the front lens group is fixed. In other words, if an embodiment in which the front lens group is manually shiftable for manual focusing operation in addition to the focusing lens unit of the present invention in the rear lens group controlled by the automatic focus control device is designed, such an embodiment is also within the scope of the present invention since the feature of the present invention and the benefit relating to the automatic focus control is still maintained.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of appended claims.

What is claimed is:

1. A zoom lens system comprising, from the object to the image side:
   a front lens group;
   a zooming lens group including at least a movable lens group; and
   a rear lens group including a fixed lens unit and a variable aperture stip located within the fixed lens unit towards the object side and a focusing lens unit movable on the image side of the fixed lens unit, wherein the lens system fulfills the following condition:

$$0.1 < \frac{|f_F|}{f_{III} \cdot \gamma} < 2$$

wherein:
   $f_F$ represents the focal length of the focusing lens unit in the rear lens group;
   $f_{III}$ represents the focal length of the whole rear lens group upon infinity focusing; and
   $\gamma$ represents the zoom ratio of the zoom lens system.

2. The invention of claim 1, wherein the focusing lens unit is of a positive refractive power and movable from the image side to the object side upon focusing from the infinity toward the closer object distance.

3. The invention of claim 2, wherein the focusing lens unit includes at least a positive lens with the stronger refractive surface facing the object side.

4. The invention of claim 3, wherein the zooming lens unit consists of a variator lens unit and a compensator lens unit moving in different speeds from each other.

5. The invention of claim 1, wherein the focusing lens unit is of a negative refractive power and movable from the object to the image side upon focusing from the infinity toward the closer object distance.

6. The invention of claim 5, wherein the focusing lens unit includes at least a negative lens with the stronger refractive surface facing the image side.

7. The invention of claim 6, wherein the zooming lens unit consists of a variator lens group and a compensator lens unit moving in different speeds from each other.

8. The invention of claim 1, wherein the aperture stop is located between lens elements of the fixed lens unit.

9. The invention of claim 1, wherein the fixed lens unit is led by the aperture stop.

10. The invention of claim 1, wherein the focusing lens unit is of a lightweight and simple construction.

11. The invention of claim 1, wherein the focusing lens unit is movable in a portion of the rear lens group inclining towards the image side.

12. The invention of claim 1, wherein the front lens group is of a positive refractive power.

13. The invention of claim 1, wherein the zooming lens unit consists of a variator lens group of a negative refractive power and a compensator lens unit of a negative refractive power.

14. The invention of claim 1, wherein the zooming lens group consists of a variator lens group of a negative refractive power and a compensator lens group of a positive refractive power.

15. The invention of claim 1, wherein the front lens group is fixed.

16. The invention of claim 1 wherein the rear lens group includes a second fixed lens unit on the image side of the focusing lens unit.

17. A zoom lens system comprising the following construction data, wherein F represents a movable focusing lens group;

|   |   |   | Radius of Curvature |   | Axial Distance |   | Refractive Index |   | Abbe Number |
|---|---|---|---|---|---|---|---|---|---|
| I | { | $r_1$ | 95.563 | | | | | | |
| | | | | $d_1$ | 4.300 | $N_1$ | 1.51823 | $\nu_1$ | 58.96 |
| | | $r_2$ | 720.269 | | | | | | |
| | | | | $d_2$ | 0.120 | | | | |
| | 105.410 | | | | | | | | |
| | | | | $d_3$ | 1.680 | $N_2$ | 1.75450 | $\nu_2$ | 32.83 |
| | | $r_4$ | 45.765 | | | | | | |
| | | | | $d_4$ | 7.770 | $N_3$ | 1.61272 | $\nu_3$ | 58.52 |
| | | $r_5$ | 1470.976 | | | | | | |
| | | | | $d_5$ | 42.916~26.280~5.050 | | | | |
| II | { | $r_6$ | 115.780 | | | | | | |
| | | | | $d_6$ | 1.200 | $N_4$ | 1.72000 | $\nu_4$ | 50.31 |
| | | $r_7$ | 41.103 | | | | | | |
| | | | | $d_7$ | 5.623 | | | | |
| | | $r_8$ | −45.187 | | | | | | |
| | | | | $d_8$ | 1.500 | $N_5$ | 1.60000 | $\nu_5$ | 64.38 |
| | | $r_9$ | 42.526 | | | | | | |
| | | | | $d_9$ | 3.200 | $N_6$ | 1.78472 | $\nu_6$ | 25.70 |
| | | $r_{10}$ | 220.131 | | | | | | |
| | | | | $d_{10}$ | 4.213~14.273~39.536 | | | | |

-continued

|   |   | Radius of Curvature | Axial Distance | Refractive Index | Abbe Number |
|---|---|---|---|---|---|
|   | $r_{11}$ | −123.721 | | | |
|   | | | $d_{11}$ 1.500 | $N_7$ 1.67000 | $\nu_7$ 57.07 |
|   | $r_{12}$ | 843.056 | | | |
|   | | | $d_{12}$ 1.459∼8.035∼4.002 | | |
|   | $r_{13}$ | 223.538 | | | |
|   | | | $d_{13}$ 2.800 | $N_8$ 1.74000 | $\nu_8$ 28.26 |
|   | $r_{14}$ | −58.573 | | | |
|   | | | $d_{14}$ 0.120 | | |
|   | $r_{15}$ | 62.726 | | | |
|   | | | $d_{15}$ 3.300 | $N_9$ 1.51763 | $\nu_9$ 53.47 |
|   | $r_{16}$ | −65.386 | | | |
|   | | | $d_{16}$ 1.950 | $N_{10}$ 1.80518 | $\nu_{10}$ 25.43 |
|   | $r_{17}$ | 290.458 | | | |
|   | | | $d_{17}$ 2.800 (Aperture stop) | | |
|   | $r_{18}$ | 40.612 | | | |
|   | | | $d_{18}$ 5.828 | $N_{11}$ 1.48749 | $\nu_{11}$ 70.15 |
|   | $r_{19}$ | −55.165 | | | |
|   | | | $d_{19}$ 1.523 | $N_{12}$ 1.72342 | $\nu_{12}$ 37.99 |
|   | $r_{20}$ | 44.160 | | | |
| III | | | $d_{20}$ 0.351 | | |
|   | $r_{21}$ | 41.659 | | | |
|   | | | $d_{21}$ 3.990 | $N_{13}$ 1.48749 | $\nu_{13}$ 70.15 |
|   | $r_{22}$ | −111.200 | | | |
|   | | | $d_{22}$ 25.960 | | |
|   | $r_{23}$ | 98.244 | | | |
|   | | | $d_{23}$ 2.500 | $N_{14}$ 1.78472 | $\nu_{14}$ 25.75 |
|   | $r_{24}$ | −1153.801 | | | |
|   | | | $d_{24}$ 1.500 | $N_{15}$ 1.51680 | $\nu_{15}$ 64.12 |
|   | $r_{25}$ | 26.452 | | | |
|   | | | $d_{25}$ 22.000 | | |
|   | $r_{26}$ | 45.668 | | | |
|   | | | $d_{26}$ 4.000 | $N_{16}$ 1.72000 | $\nu_{16}$ 50.31 |
| F | $r_{27}$ | 2749.518 | | | |
|   | | | $d_{27}$ 1.000 | $N_{17}$ 1.71736 | $\nu_{17}$ 29.42 |
|   | $r_{28}$ | 88.147 | | | |

18. A zoom lens system comprising, from the object to the image side:
  a front lens group;
  a zooming lens group including at least a movable variator lens unit and a compensator lens unit; and
  a rear lens group consisting of a fixed lens unit with a variable aperture stop included therein and a movable focusing lens unit, for focusing the zoom lens system from infinity to a close distance, on the image side of the aperture stop, wherein the lens system fulfills the following condition:

$$0.1 < \frac{|f_F|}{f_{III} \cdot \gamma} < 2$$

wherein:
  $f_F$ represents the focal length of the focusing lens unit in the rear lens group;
  $f_{III}$ represents the focal length of the whole rear lens group upon infinity focusing; and
  $\gamma$ represents the zoom ratio of the zoom lens system.

19. A zoom lens system comprising, from the object to the image side:
  a front lens group;
  a zooming lens group including at least a movable lens group; and
  a rear lens group including a fixed lens unit and a variable aperture stop fixed with the fixed lens unit in an object side portion of the rear lens group and a focusing lens unit movable on the image side of the fixed lens unit and the aperture stop, wherein the lens system fulfills the following condition:

$$0.1 < \frac{|f_F|}{f_{III} \cdot \gamma} < 2$$

wherein:
  $f_F$ represents the focal length of the focusing lens unit in the rear lens group;
  $f_{III}$ represents the focal length of the whole rear lens group upon infinity focusing; and
  $\gamma$ represents the zoom ratio of the zoom lens system.

* * * * *